(12) United States Patent
Li et al.

(10) Patent No.: US 10,406,634 B2
(45) Date of Patent: Sep. 10, 2019

(54) ENHANCING STRENGTH IN LASER CUTTING OF CERAMIC COMPONENTS

(71) Applicant: Apple Inc., Cupertino, CA (US)

(72) Inventors: Michael M. Li, Cupertino, CA (US); Palaniappan Chinnakaruppan, Cupertino, CA (US); Yulei Sun, Shanghai (CN); Phillip W. Hum, Cupertino, CA (US); Marwan Rammah, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 316 days.

(21) Appl. No.: 14/788,897

(22) Filed: Jul. 1, 2015

(65) Prior Publication Data
US 2017/0001266 A1    Jan. 5, 2017

(51) Int. Cl.
*B23K 26/402* (2014.01)
*B23K 26/38* (2014.01)
*B23K 26/18* (2006.01)
*B23K 26/0622* (2014.01)
*B23K 26/361* (2014.01)
*B23K 103/00* (2006.01)

(52) U.S. Cl.
CPC .......... *B23K 26/38* (2013.01); *B23K 26/0624* (2015.10); *B23K 26/18* (2013.01); *B23K 26/361* (2015.10); *B23K 26/402* (2013.01); *B23K 2103/52* (2018.08)

(58) Field of Classification Search
None
See application file for complete search history.

(56) References Cited

U.S. PATENT DOCUMENTS

| | | |
|---|---|---|
| 2,248,955 A | 7/1941 | Capps |
| 2,854,794 A | 10/1958 | Luedeman |
| 3,658,631 A | 4/1972 | Shaw et al. |
| 3,753,775 A | 8/1973 | Robinson et al. |
| 3,911,670 A | 10/1975 | Hofer |
| 3,964,942 A | 1/1976 | Berkenblit et al. |

(Continued)

FOREIGN PATENT DOCUMENTS

| | | |
|---|---|---|
| DE | 202008002512 | 6/2008 |
| EP | 0305626 | 3/1989 |

(Continued)

OTHER PUBLICATIONS

Schmid et al., "Effect of Crystal Orientation and Temperature on the Strength of Sapphire," J.Am.Ceram.Soc., 81, 1998, pp. 885-893.

(Continued)

*Primary Examiner* — Matthew J Daniels
*Assistant Examiner* — Mohammad M Ameen
(74) *Attorney, Agent, or Firm* — Dorsey & Whitney LLP

(57) ABSTRACT

A ceramic material, such as sapphire, is irradiated using a laser-based process to form a cut. In some implementations, a region of the ceramic material adjacent to the cut may be heated. The region may be removed to form an edge feature. In various implementations, the region of the ceramic material adjacent to the cut may be shielded from an outer portion of a laser beam used in the laser-based process using a shield, such as a polyethylene film. This removal and/or shielding operations may improve the mechanical strength of the ceramic material.

18 Claims, 7 Drawing Sheets

(56) References Cited

U.S. PATENT DOCUMENTS

| | | |
|---|---|---|
| 4,008,111 A | 2/1977 | Rutz |
| 4,054,895 A | 10/1977 | Ham |
| 4,070,211 A | 1/1978 | Harari |
| 4,085,302 A | 4/1978 | Zenk et al. |
| 4,339,300 A | 7/1982 | Noble |
| 4,393,578 A | 7/1983 | Cady et al. |
| 4,459,038 A | 7/1984 | Lederrey |
| 4,473,306 A | 9/1984 | Lederrey |
| 4,662,124 A | 5/1987 | Kato et al. |
| 4,732,867 A | 3/1988 | Schnable |
| 4,735,917 A | 4/1988 | Flatley et al. |
| 4,775,641 A | 10/1988 | Duffy et al. |
| 4,826,300 A | 2/1989 | Efron et al. |
| 4,811,004 A | 3/1989 | Person et al. |
| 4,849,299 A | 7/1989 | Loth |
| 4,908,074 A | 3/1990 | Hosoi et al. |
| 4,946,546 A | 8/1990 | Bourgeois |
| 5,069,743 A | 12/1991 | Wysocki et al. |
| 5,151,389 A | 9/1992 | Zappella |
| 5,154,023 A | 10/1992 | Sioshansi |
| 5,377,669 A | 1/1995 | Schulz |
| 5,413,360 A | 5/1995 | Atari et al. |
| 5,427,051 A | 6/1995 | Maxwell et al. |
| 5,441,591 A | 8/1995 | Imthurn et al. |
| 5,451,553 A | 9/1995 | Scott et al. |
| 5,543,630 A | 8/1996 | Bliss et al. |
| 5,549,746 A | 8/1996 | Scott et al. |
| 5,627,109 A | 5/1997 | Sassa et al. |
| 5,661,313 A | 8/1997 | Dubbelday et al. |
| 5,697,998 A | 12/1997 | Platus et al. |
| 5,702,654 A | 12/1997 | Chen et al. |
| 5,804,522 A | 9/1998 | Uegami |
| 5,839,424 A | 11/1998 | Hauser |
| 5,852,622 A | 12/1998 | Meissner et al. |
| 5,877,094 A | 3/1999 | Egley et al. |
| 5,904,136 A | 5/1999 | Nagatsuka et al. |
| 6,012,303 A | 1/2000 | Axelson et al. |
| 6,024,814 A | 2/2000 | Banzawa et al. |
| 6,025,060 A | 2/2000 | Meissner et al. |
| 6,028,711 A | 2/2000 | Adachi |
| 6,028,762 A | 2/2000 | Kamitani |
| 6,030,849 A | 2/2000 | Hasegawa et al. |
| 6,038,079 A | 3/2000 | Michaels |
| 6,119,673 A | 9/2000 | Nakaura |
| 6,123,026 A | 9/2000 | Gottlieb |
| 6,159,285 A | 12/2000 | Toombs et al. |
| 6,265,089 B1 | 7/2001 | Fatemi et al. |
| 6,379,985 B1 | 4/2002 | Cervantes et al. |
| 6,406,769 B1 | 6/2002 | Delabre |
| 6,424,017 B2 | 7/2002 | Kurtz et al. |
| 6,483,237 B2 | 11/2002 | Eastlund et al. |
| 6,489,221 B2 | 12/2002 | Gehrke et al. |
| 6,491,424 B1 | 12/2002 | Tardy |
| 6,514,576 B1 | 2/2003 | Kintaka et al. |
| 6,524,162 B1 | 2/2003 | Hauser |
| 6,547,722 B1 | 4/2003 | Higuma et al. |
| 6,586,819 B2 | 7/2003 | Matsuoka |
| 6,642,989 B2 | 11/2003 | Umehara et al. |
| 6,775,073 B2 | 8/2004 | Fukazawa |
| 6,809,010 B1 | 10/2004 | Kinoshita et al. |
| 6,818,532 B2 | 11/2004 | Moeggenborg et al. |
| 6,819,693 B2 | 11/2004 | Derriey et al. |
| 6,849,524 B2 | 2/2005 | Shelton et al. |
| 6,852,253 B2 | 2/2005 | Tomioka |
| 6,858,274 B2 | 2/2005 | Fukazawa |
| 6,872,108 B2 | 3/2005 | Hsu |
| 6,875,099 B2 | 4/2005 | Tatartchenko et al. |
| 6,911,375 B2 | 6/2005 | Mack, III et al. |
| 6,941,940 B1 | 9/2005 | Zavattari et al. |
| 7,018,709 B2 | 3/2006 | Stevenson et al. |
| 7,030,417 B2 | 4/2006 | Bakshi et al. |
| 7,074,652 B2 | 7/2006 | Kumaran et al. |
| 7,128,846 B2 | 10/2006 | Gaudin et al. |
| 7,137,865 B2 | 11/2006 | Hammer et al. |
| 7,151,045 B2 | 12/2006 | Hasegawa et al. |
| 7,171,290 B2 | 1/2007 | Morinaga et al. |
| 7,208,096 B2 | 4/2007 | Cherian et al. |
| 7,255,740 B2 | 8/2007 | Sprenger et al. |
| 7,268,741 B2 | 9/2007 | Sarabandi et al. |
| 7,285,168 B2 | 10/2007 | Bradaczek et al. |
| 7,390,702 B2 | 6/2008 | Nakamura |
| 7,495,615 B2 | 2/2009 | Yamanaka et al. |
| 7,499,093 B2 | 3/2009 | Campbell |
| 7,561,351 B2 | 7/2009 | Konno |
| 7,616,951 B2 | 11/2009 | Chang et al. |
| 7,619,567 B2 | 11/2009 | Lynch et al. |
| 7,663,189 B2 | 2/2010 | Fukuda |
| 7,683,838 B2 | 3/2010 | Koyama et al. |
| 7,704,321 B2 | 4/2010 | Riman et al. |
| 7,803,451 B2 | 9/2010 | Lee et al. |
| 7,807,549 B2 | 10/2010 | Tong et al. |
| 7,883,557 B2 | 2/2011 | Liu et al. |
| 7,902,474 B2 | 3/2011 | Mittleman et al. |
| 7,943,241 B2 | 5/2011 | Kurokawa et al. |
| 7,943,953 B2 | 5/2011 | Sakamoto et al. |
| 7,956,356 B2 | 6/2011 | Tanikella et al. |
| 7,966,785 B2 | 6/2011 | Zadesky et al. |
| 7,977,587 B2 | 7/2011 | Rajagopal et al. |
| 7,999,895 B2 | 8/2011 | Tan et al. |
| 8,003,189 B2 | 8/2011 | Jones et al. |
| 8,014,142 B2 | 9/2011 | Prest et al. |
| 8,157,912 B2 | 4/2012 | Wei |
| 8,158,900 B2 | 4/2012 | Maatta |
| 8,197,303 B2 | 6/2012 | Tanikella et al. |
| 8,259,901 B1 | 9/2012 | Kamireddi |
| 8,268,656 B2 | 9/2012 | Kajiyama |
| 8,304,325 B2 | 11/2012 | Fujii et al. |
| 8,390,023 B2 | 3/2013 | Armitage et al. |
| 8,424,746 B2 | 4/2013 | Adachi et al. |
| 8,455,879 B2 | 6/2013 | Tanikella et al. |
| 8,481,460 B2 | 7/2013 | Goyal |
| 8,616,024 B2 | 12/2013 | Cornejo et al. |
| 8,624,759 B2 | 1/2014 | Maenpaa et al. |
| 8,652,658 B2 | 2/2014 | Tatartchenko et al. |
| 8,691,364 B2 | 4/2014 | Hasegawa et al. |
| 8,721,917 B2 | 5/2014 | Cherian et al. |
| 8,859,446 B2 | 10/2014 | Ozaki et al. |
| 8,882,077 B2 | 11/2014 | Stoddard |
| 8,937,689 B2 | 1/2015 | Prest et al. |
| 8,951,630 B2 | 2/2015 | Tosatti et al. |
| 8,964,513 B2 | 2/2015 | Derriey et al. |
| 9,011,997 B2 | 4/2015 | Weber |
| 9,012,045 B2 | 4/2015 | Krell et al. |
| 9,120,960 B2 | 9/2015 | Bakshi et al. |
| 9,154,678 B2 | 10/2015 | Kwong et al. |
| 9,221,289 B2 | 12/2015 | Prest et al. |
| 9,225,056 B2 | 12/2015 | Pope et al. |
| 9,232,672 B2 | 1/2016 | Kwong et al. |
| 9,716,815 B2 | 7/2017 | Kwong et al. |
| 9,718,249 B2 | 8/2017 | Kwong |
| 2001/0034564 A1* | 10/2001 | Jones .................. B23K 26/073 700/166 |
| 2002/0017653 A1 | 2/2002 | Chuang |
| 2002/0104831 A1* | 8/2002 | Chang ................ B23K 26/0075 219/121.7 |
| 2002/0167068 A1 | 11/2002 | Hsu et al. |
| 2002/0168837 A1 | 11/2002 | Hsu et al. |
| 2003/0111448 A1* | 6/2003 | Mosavi .................. A61B 17/06 219/121.71 |
| 2005/0012109 A1* | 1/2005 | Kohno ................... H01L 33/20 257/103 |
| 2006/0003587 A1 | 1/2006 | Hsu et al. |
| 2006/0043396 A1 | 3/2006 | Tsuda et al. |
| 2006/0055619 A1 | 3/2006 | Sarabandi et al. |
| 2006/0162849 A1 | 7/2006 | Han |
| 2006/0196849 A1 | 9/2006 | Moeggenborg et al. |
| 2007/0193986 A1* | 8/2007 | Schulz ................ B23K 26/073 219/121.71 |
| 2007/0204493 A1 | 9/2007 | Foley et al. |
| 2008/0145632 A1 | 6/2008 | Nagami |
| 2008/0264767 A1 | 10/2008 | Chen et al. |
| 2009/0035504 A1 | 2/2009 | Pishchik et al. |
| 2009/0130415 A1 | 5/2009 | Mack, III et al. |
| 2009/0268019 A1 | 10/2009 | Ishii et al. |

(56) References Cited

U.S. PATENT DOCUMENTS

| | | |
|---|---|---|
| 2009/0321234 A1 | 12/2009 | Yu et al. |
| 2010/0147813 A1* | 6/2010 | Lei ................... C03B 33/082 219/121.72 |
| 2010/0279577 A1* | 11/2010 | Joo .................... B23K 26/10 445/25 |
| 2010/0297855 A1* | 11/2010 | Morikazu .......... B23K 26/032 438/795 |
| 2011/0019354 A1 | 1/2011 | Prest et al. |
| 2011/0062394 A1 | 3/2011 | Kumaran et al. |
| 2011/0168005 A1 | 7/2011 | Pluen et al. |
| 2011/0177300 A1 | 7/2011 | Hankey et al. |
| 2011/0195560 A1 | 8/2011 | Gaudin et al. |
| 2011/0223840 A1 | 9/2011 | Morinaga et al. |
| 2012/0000415 A1 | 1/2012 | D'Evelyn et al. |
| 2012/0038471 A1 | 2/2012 | Kim et al. |
| 2012/0068213 A1 | 3/2012 | Zhang et al. |
| 2012/0111726 A1* | 5/2012 | Couto Petri ...... G01N 27/4075 204/424 |
| 2012/0118228 A1 | 5/2012 | Lee et al. |
| 2012/0212890 A1 | 8/2012 | Hoshino et al. |
| 2012/0229424 A1 | 9/2012 | Behles et al. |
| 2013/0089701 A1* | 4/2013 | Hooper ................ B23K 26/00 428/131 |
| 2013/0102359 A1 | 4/2013 | Ho |
| 2013/0236699 A1 | 9/2013 | Prest et al. |
| 2013/0237402 A1 | 9/2013 | Wang et al. |
| 2014/0083353 A1 | 3/2014 | Pope et al. |
| 2016/0087332 A1 | 3/2016 | Pope et al. |
| 2017/0285686 A1 | 10/2017 | Kwong et al. |

FOREIGN PATENT DOCUMENTS

| | | |
|---|---|---|
| EP | 1013802 | 6/2000 |
| EP | 1829846 | 9/2007 |
| EP | 2520401 | 11/2012 |
| GB | 1135886 | 12/1968 |
| JP | 54032062 | 3/1979 |
| JP | 1173764 | 7/1989 |
| JP | 2039578 | 2/1990 |
| JP | 3021048 | 1/1991 |
| JP | 03115200 | 5/1991 |
| JP | 3177335 | 8/1991 |
| JP | 3250659 | 11/1991 |
| JP | 5027257 | 2/1993 |
| JP | 5085894 | 4/1993 |
| JP | 5313103 | 11/1993 |
| JP | 5333164 | 12/1993 |
| JP | 5335435 | 12/1993 |
| JP | 06242260 | 9/1994 |
| JP | 6314694 | 11/1994 |
| JP | 06337292 | 12/1994 |
| JP | 7129952 | 5/1995 |
| JP | 07145000 | 6/1995 |
| JP | 07206600 | 8/1995 |
| JP | 8040797 | 2/1996 |
| JP | 8148594 | 6/1996 |
| JP | 09008690 | 1/1997 |
| JP | H0933456 | 2/1997 |
| JP | 9213773 | 8/1997 |
| JP | 9270565 | 10/1997 |
| JP | 9295895 | 11/1997 |
| JP | 10239520 | 9/1998 |
| JP | 10269543 | 10/1998 |
| JP | 10275955 | 10/1998 |
| JP | 10335259 | 12/1998 |
| JP | 2849602 | 1/1999 |
| JP | 11135889 | 5/1999 |
| JP | 2000183203 | 6/2000 |
| JP | 2000196149 | 7/2000 |
| JP | 2001134927 | 5/2001 |
| JP | 2001176993 | 6/2001 |
| JP | 2001237335 | 8/2001 |
| JP | 2001298170 | 10/2001 |
| JP | 2002015977 | 1/2002 |
| JP | 2002109854 | 4/2002 |
| JP | 2002184845 | 6/2002 |
| JP | 2002201096 | 7/2002 |
| JP | 2002255694 | 9/2002 |
| JP | 2002289529 | 10/2002 |
| JP | 2002293692 | 10/2002 |
| JP | 2003015156 | 1/2003 |
| JP | 2003069176 | 3/2003 |
| JP | 2003133802 | 5/2003 |
| JP | 2003137690 | 5/2003 |
| JP | 2003245847 | 9/2003 |
| JP | 2003277194 | 10/2003 |
| JP | 2003282551 | 10/2003 |
| JP | 2003332234 | 11/2003 |
| JP | 2004111848 | 4/2004 |
| JP | 2004168622 | 6/2004 |
| JP | 2004288934 | 10/2004 |
| JP | 2004296575 | 10/2004 |
| JP | 2004296701 | 10/2004 |
| JP | 2004296912 | 10/2004 |
| JP | 2005047718 | 2/2005 |
| JP | 2005064492 | 3/2005 |
| JP | 2005079171 | 3/2005 |
| JP | 2005085888 | 3/2005 |
| JP | 2005101230 | 4/2005 |
| JP | 2005104742 | 4/2005 |
| JP | 2005136106 | 5/2005 |
| JP | 2005-150523 * | 6/2005 |
| JP | 2005277334 | 10/2005 |
| JP | 2005285869 | 10/2005 |
| JP | 2005314121 | 11/2005 |
| JP | 2006016230 | 1/2006 |
| JP | 2006016239 | 1/2006 |
| JP | 2006062931 | 3/2006 |
| JP | 2006066442 | 3/2006 |
| JP | 2006232639 | 9/2006 |
| JP | 2006232640 | 9/2006 |
| JP | 2006339308 | 12/2006 |
| JP | 2007010730 | 1/2007 |
| JP | 2007150072 | 6/2007 |
| JP | 2007237627 | 9/2007 |
| JP | 2007237628 | 9/2007 |
| JP | 2007269577 | 10/2007 |
| JP | 2008111984 | 5/2008 |
| JP | 2008211040 | 9/2008 |
| JP | 2008297150 | 12/2008 |
| JP | 2009040639 | 2/2009 |
| JP | 2009263534 | 11/2009 |
| JP | 2010056485 | 3/2010 |
| JP | 2011241190 | 12/2011 |
| KR | 20100090897 | 8/2010 |
| TW | 200909216 | 3/2009 |
| TW | 201117248 | 5/2011 |
| TW | M438642 | 10/2012 |
| WO | WO98/56575 | 12/1998 |
| WO | WO02/054718 | 7/2002 |
| WO | WO2004/059731 | 7/2004 |
| WO | WO2007/143480 | 12/2007 |
| WO | WO2008/036888 | 3/2008 |
| WO | WO2008/093704 | 8/2008 |
| WO | WO2008/122296 | 10/2008 |
| WO | WO2009/025842 | 2/2009 |
| WO | WO2009/151160 | 12/2009 |
| WO | WO2010/057842 | 2/2010 |
| WO | WO2010/090116 | 8/2010 |

OTHER PUBLICATIONS

Quick, Darren, "Aston Martin teams with Mobiado for transparent touchscreen concept phone," Mar. 28, 2011, pp. 1-5, retrieved from the internet: URL:http://www-gizmag.com/cpt002-aston-martin-concept-phone/18248.

Zahler, James, "Sapphire and GaN Substrate Materials," DOE SSL Manufacturing R&D Workshop 2012, Presentation, Apr. 14, 2012, pp. 1-19.

Flores, Marc, "Can a Case Scratch the iPhone 4's Glass and Shatter it?," Oct. 8, 2010, pp. 1-10, retrieved from the internet: URL:http://www.intomobile.com/2010/10/08/glassgate-iphone-4.

(56) References Cited

OTHER PUBLICATIONS

Sykes, Neil, "The Use of Lasers in Target Manufacture," 2010, pp. 1-24, retrieved from the internet: URL:heep://www.stfc.ac.uk/CLF/resources/PDF/events_3effw_weds_sykes.pdf.

Watanabe, "Twinned Crystals of Corundum Grown from Cryolite Flux," Crystal Research Technology, vol. 24, 1989, pp. 197-1205.

* cited by examiner

DETAIL 1

ENHANCING STRENGTH IN LASER CUTTING OF CERAMIC COMPONENTS

FIELD

The described embodiments relate generally to manufacture of ceramic components, such as sapphire. More particularly, the present embodiments relate to enhancing strength in ceramic components that are cut using a laser-based process.

BACKGROUND

Consumer or non-consumer devices may include components (such as protective coverings, windows, and/or surfaces) formed from ceramic materials. One example of such a ceramic material is corundum. Corundum is a crystalline form of aluminum oxide and is found in various different colors, most of which are generally referred to as sapphire. Sapphire is a hard and strong material with a hardness of 9.0 on the Mohs scale, and, as such, is capable of scratching nearly all other minerals. Because of its hardness and strength, sapphire may be an attractive alternative to other translucent materials like glass or polycarbonate. Sapphire may also be produced in thin sheets and polished to achieve exceptional optical performance.

Compared to other optically clear materials like traditional polycarbonate or other types of plastic, ceramic materials (such as sapphire) may offer improved scratch resistance and strength. However, ceramic materials may be difficult to machine because of their hardness. Embodiments described herein are directed to manufacturing ceramic materials without the drawbacks of some traditional techniques.

SUMMARY

The present disclosure relates to forming a ceramic component using laser cutting. A ceramic material, such as sapphire, may be irradiated using a laser-based process to form a cut. A region of the ceramic material adjacent to the cut may be heated and may be removed to form an edge feature in various implementations. The region of the ceramic material adjacent to the cut may be shielded from an outer portion of a laser beam used in the laser-based process using a shield in some implementations. Such removal and/or shielding may improve the mechanical strength of the ceramic material.

In various embodiments, a method for forming a ceramic component may include irradiating a ceramic material using a laser-based process to form a cut, heating a region of the ceramic material adjacent to the cut, and removing the region of the ceramic material.

In some examples, the operation of irradiating and the operation of heating may occur at different times. In various examples, the operation of heating may heat the region of the ceramic material with an outer portion of a laser beam used in the laser-based process and the outer portion may have an energy insufficient to cut the ceramic material during the operation of irradiating.

In various examples, the operation of irradiating may include irradiating the ceramic material through a first laser-based process using a first laser beam and the operation of removing the region of the ceramic material may include removing the region of the ceramic material through a second laser-based process using a second laser beam. The second laser beam may have a lower power than the first laser beam. The second laser-based process may include a shorter duration pulse than the first laser-based process.

In some examples, the operation of heating the region of the ceramic material may form a defect such as micro-cracks in the ceramic material. The operation of removing the region of the ceramic material may remove the micro-cracks in the ceramic material. The operation of removing the region of the ceramic material may introduce additional micro-cracks in the ceramic material that are smaller than the micro-cracks. The operation of removing the region of the ceramic material may remove a section of the ceramic material having a depth of approximately 15-25 microns.

In some embodiments, a method for forming a ceramic component may include irradiating a ceramic material with a laser beam to form a cut and shielding a region of the ceramic material adjacent to the cut from an outer portion of the laser beam using a shield (such as a plastic film).

In various examples, the method may further include absorbing, with the shield, at least part of the energy of an outer portion of the laser beam to reduce thermal stress within the shielded region. In some examples, the method may further include applying the shield to the ceramic material before irradiating the ceramic material.

In various examples, the method may also include heating the region through the shield to form a defect in the ceramic material and removing the defect using an additional laser beam.

In various embodiments, a ceramic component (such as at least one of sapphire, zirconia, or glass) may include a surface formed by laser cutting the ceramic component and an edge feature (such as at least one of a chamfer, a bezel, a shelf, a curve, or a rounding) formed along the surface by removing a thermally stressed region of the ceramic component.

In some examples, the ceramic component may be formed by shielding a region of the ceramic component with a shield from an outer portion of a laser beam used in the laser cutting.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Laser cutting of ceramic materials, such as sapphire, may thermally stress ceramic materials in ways that affect the mechanical strength of the ceramic materials. For example, many laser beams have a Gaussian energy distribution (e.g., high energy concentration at a core of the laser beam that tapers to zero at the outside portions of the laser beam). As a result, the core of the laser beam may have sufficient energy to cut a ceramic material, but outer portions outside of the core of the laser beam may have insufficient energy to cut within the time of the cutting operation. Though these lower energy outer portions of the laser beam may not have sufficient energy to cut the ceramic material, they may still heat and thermally stress regions of the ceramic material adjacent to the cut. This heating may form micro-cracks or other defects in the affected region of the ceramic material. Such defects may reduce the mechanical strength of the ceramic material, such as bending strength. These defects may spread when the ceramic material is stressed (such as micro-cracks that spread or otherwise weak areas in which micro-cracks may form), such as when the ceramic material experiences an impact or shock.

As discussed herein, in accordance with various embodiments, ceramic components (such as sapphire) can be manufactured using a laser cutting process that may reduce or eliminate some issues related to manufacturing ceramic components.

The present disclosure relates to forming a ceramic component using a laser-based process. A ceramic material may be irradiated using a laser-based process to form a cut. In some implementations, a region of the ceramic material adjacent to the cut may be heated and the region may be removed to form an edge feature (such as a chamfer, a bezel, a shelf, a curve, a rounding, and so on). In various implementations, the laser-based process may use a laser beam and the region of the ceramic material adjacent to the cut may be shielded from an outer portion of the laser beam using a shield. The shield may be formed of polyethylene or another plastic and/or any material operable to shield the ceramic material from an outer portion of the laser beam. The shield may shield the ceramic material by absorbing and/or blocking at least part of the outer portion of the laser beam. Such an outer portion may have insufficient energy to cut the ceramic material during the irradiating. This removal and/or shielding may improve the mechanical strength of the ceramic material.

Figure 1A:
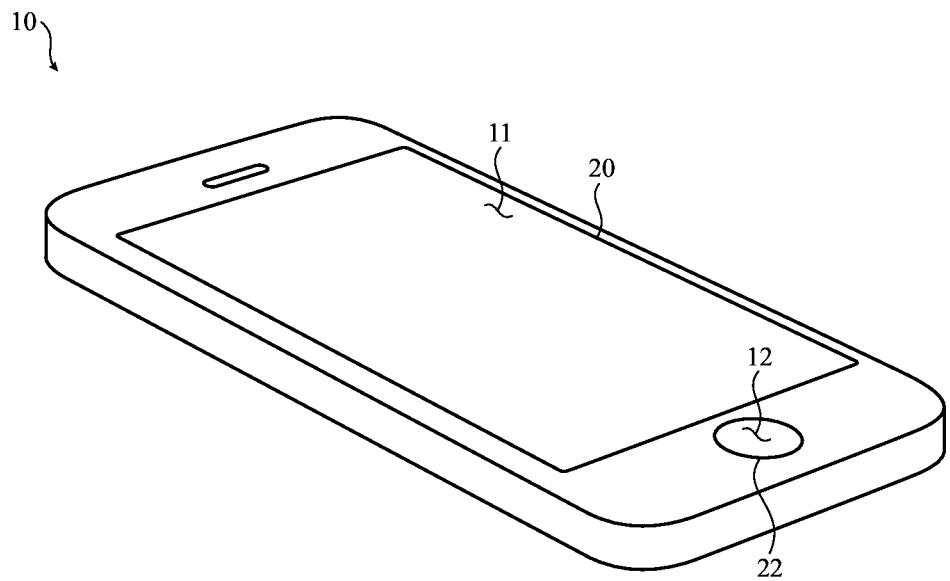
FIG. 1A shows a front isometric view of an example electronic device.
Figure 1B:
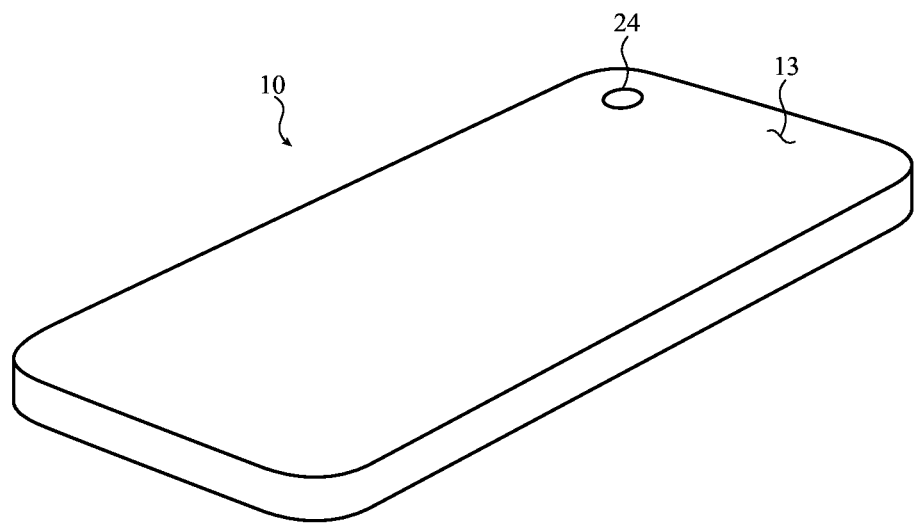
FIG. 1B shows a rear isometric view of an example electronic device.

In accordance with various embodiments, FIGS. 1A-B show a device having one or more example ceramic components or parts that may be manufactured according to the techniques discussed herein. In this example, the ceramic components may be multiple hard protective sheets formed of sapphire, zirconia, glass, or other ceramic material on the exterior of the device. Such protective sheets may provide outstanding scratch resistance and enhance the mechanical integrity of the device. A protective sheet may also function as an optically transmissive window and provide visibility to underlying components, such as display screens or graphical elements. In a typical implementation, both the optical and mechanical properties of the protective sheets may be important to perception of quality and performance of the device.

As shown in FIG. 1A, the device 10 includes protective cover sheet 11 formed from a ceramic component and used as an optically transmissive protective layer. The cover sheet 11 is typically attached to the device 10 using an optically transmissive adhesive or other bonding technique. In this example, the cover sheet 11 is attached using a pressure sensitive adhesive (PSA) film. The cover sheet 11 may be attached to the face of the display screen 20 and protect the display screen 20 from scratches or other physical damage. The display screen 20 may include a liquid crystal display (LCD), organic light emitting diode (OLED) display, or similar display element. Because the cover sheet 11 overlays the display screen 20, optical clarity, a polished surface finish, material thickness, and physical strength may be useful aspects of the cover sheet's 11 functionality, alone or in conjunction with other such aspects. The cover sheet 11 may also be attached to, or be integrated with, a transparent electronic sensor that overlays the display screen 20. In some cases, the electronic sensor covers the entire display screen 20 and is used as the main input device for the user. In some implementations, the cover sheet 11 may be integrated with a touch sensor configured to detect finger or stylus touches on the surface of the cover sheet 11, a force sensor configured to determine a force exerted on the cover sheet 11, or other sensors that detect interactions with the cover sheet 11.

As shown in FIG. 1A, the front surface of the device 10 also includes a button sheet 12 used to protect the surface of the control button 22. In this example, the button sheet 12 is formed from a ceramic component and is used as an optically transmissive protective layer. The button sheet 12 protects the surface of the control button 22 and allows visibility of any graphical elements that are printed on the control button 22. In some cases, it is not necessary that the button sheet 12 be optically transmissive. For example, the button sheet 12 may be opaque and itself printed with a graphical element or symbol. In this case, the button sheet 12 is a flat sheet, but in other embodiments, the button sheet 12 may be formed as a contoured or curved surface.

The button sheet 12 may enhance the mechanical strength of control button 22, which is used as an input to the device 10. In the present example, the control button 22 includes a tactile switch which is operated by depressing the control button 22. The control button 22 may also include or be associated with an electronic touch sensor, such as a capacitive touch sensor or biometric sensor. The button sheet 12 may be attached directly to a housing of the control button 22 and may, alternatively be attached or integrated with the electronic touch sensor of the control button 22. Similarly, a ceramic component can be used as a protective cover for a variety of input mechanisms, including a slide, wheel, key, and the like.

As shown in FIG. 1B, the back surface of the device 10 is protected by a back sheet 13. Similar to the cover sheet 11, the back sheet 13 is also formed from a ceramic component and is used as an optically transmissive protective layer. In this case, the back sheet 13 provides visibility of graphical elements printed on the back face of the device 10. In this case, the back sheet 13 covers the entire back of the device 10, except for the area near the camera lens 24. A separate ceramic component may be used to protect the camera lens 24. In an alternative embodiment, the back sheet 13 also covers the camera lens 24 and a separate ceramic component is not used.

As shown in FIGS. 1A-B, the device 10 is a portable electronic device. The device 10 may be any one of a variety of devices utilizing a hard substrate as a covering, window, and/or surface. For example, the device 10 may be a portable electronic device, such as a mobile phone, portable media player, wearable electronic device, health monitoring device, and/or other portable appliance. Similar types of protective covers may be applied to other electronic devices, including, for example, tablet computers, notebook computers, and various wearable devices. Additionally, the protective covers may be applied to other types of devices including non-electronic devices, such as mechanical watches which utilize an optically transmissive face over the dial. Alternatively, the protective covers may be integrated with any device that includes a hard exterior surface, particularly if the surface includes a display screen, camera, or other optical element.

As discussed above with respect to FIGS. 1A-B, various components (e.g., cover sheet 11, button sheet 12, and back sheet 13) of an electronic device may be formed from ceramic material, which may include various forms of aluminum oxide. Such ceramic materials may undergo a plurality of processes (e.g., laser cutting) in order to form one or more ceramic components used as a protective sheet for electronic device 10. Such processes may include various techniques discussed herein that improve the mechanical strength of the ceramic material.

Techniques of forming ceramic components or parts using laser cutting will now be described. While the following examples are provided with respect to an ablation laser cutting process, the systems and techniques may also be applicable to other types of laser-based processes including, for example, laser fusion, laser etching, physical etching, laser scribing, laser stress cracking, and the like.

Figure 2:
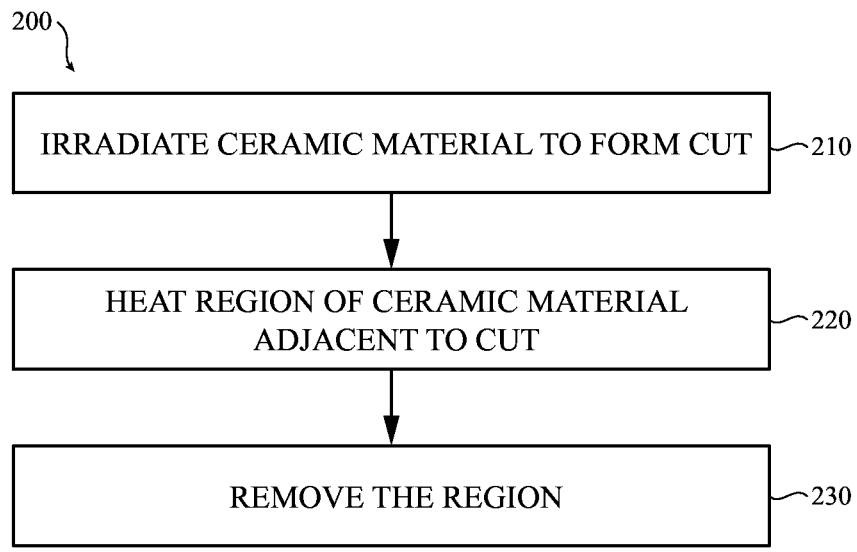
FIG. 2 shows a flow chart of a first example process for forming a ceramic component.

FIG. 2 shows a flow chart of a first example process 200 for forming a ceramic component. Such a ceramic component may be a component such as the cover sheet 11, the button sheet 12, and/or the back sheet 13 of FIGS. 1A-1B.

At 210, a ceramic material may be irradiated using a laser-based process to form a cut. The laser-based process may use a laser beam. In some cases, the irradiation may be performed using an ablation laser cutting process where the laser beam heats a portion of the ceramic material corresponding to the cut until the portion evaporates, sublimates, or is converted to plasma and is thus removed to form the cut.

In a non-limiting example, a laser may be used in an ablation laser cutting process to form the cut. The laser may include one or more of a variety of lasers that are suitable for providing a laser beam capable of forming the cut in the ceramic material, as discussed herein. In some embodiments, the laser cut is performed using a laser that is configured to produce a laser beam at wavelengths centered at approximately 1070 nanometers and pulse durations ranging from 1 to 20 picoseconds. The laser may be configured to produce a laser beam with a power ranging from 10 watts to 100 watts average power. The laser produces multiple laser pulses in order to form the cut by evaporating portions of the ceramic material, sublimating portions of the ceramic material, and/or converting portions of the ceramic material to plasma. The laser may be configured to produce a laser beam ranging from 10 watts to 100 watts average power and may pulse the laser beam one time in order to remove a region adjacent to the cut.

The laser beam may have a Gaussian energy distribution or otherwise does not have a uniform energy distribution. The laser beam may have a core portion of a higher energy and one or more outer portions outside the core with lower energy than the core. The higher energy of the core portion may be sufficient to cut the ceramic material. The lower energy of the one or more outer portions may be insufficient to cut the ceramic material during the irradiating. However, the lower energy of the one or more outer portions may still heat the region of the ceramic material adjacent to the cut. This heating may create a thermally induced stress and may form micro-cracks and/or other defects that may adversely impact the mechanical strength (such as bending strength) of the ceramic material.

At 220, the region of the ceramic material adjacent to the cut may be heated and/or a thermal stress therein may be otherwise induced. The region may be heated by the laser-based process. The heating of the region of the ceramic material may form a defect in the ceramic material, such as one or more micro-cracks. In some implementations, the region may be heated at the same time the cut is formed. However, in other implementations, the irradiating to form the cut and the heating may occur at different times. For example, the laser-based process may involve multiple passes of a laser, one or more of which may heat the region. By way of another example, various other processes performed after the irradiating may heat the region of the ceramic material.

At 230, an edge feature (such as a chamfer, a bezel, a shelf, a curve, a rounding, and so on) may be formed on the region of the ceramic material adjacent to the cut by removing at least a portion of the region. The removal of the region may remove ceramic material thermally stressed by the heating and thus remove micro-cracks or other defects or fill micro-cracks or other defects caused by the cutting with molten ceramic material. The removal of the region may also change the impact geometry of the region of the ceramic material such that an impact or shock to the ceramic material is less likely to cause present micro-cracks or other defects to spread and/or otherwise improve the mechanical strength of the ceramic material.

In some cases, the removal of the region may be performed using a laser-based process. The laser-based process may be the laser-based process of 210 and/or may be another laser-based process. For example, the laser-based process of 210 may be a first laser-based process using a first laser beam and the removal may be performed using a second laser-based process using a second (or additional) laser beam. In some implementations where first and second laser-based processes are used, the second laser beam used in the second laser-based process may have a lower power than a first laser beam used in the first laser-based process. In some implementations, the second laser-based process may include a shorter duration pulse than the first laser-based process.

In other cases, the removal of the region may be performed by a variety of different processes. Such processes may include machining, grinding, lapping, polishing, abrasion, blasting, etching, and/or any other process capable of removing the region.

The removal of ceramic material during the formation of the edge feature may be lower energy, performed for a shorter duration, and/or with any other parameters otherwise less likely to produce a thermal gradient that may thermally stress the ceramic material than the removal of ceramic material during the irradiating to form the cut. For example, if irradiating uses 7-15 pulses of a laser beam at 30-45 watts average power, the formation of the edge feature using the laser beam may use one pulse of the laser beam at 10-25 watts average power. By way of another example, the formation of the edge feature may remove less ceramic material than the irradiating and thus use less energy, such as where the ceramic material is cut through a thickness of 0.3 millimeters and a section of the ceramic material having a depth of approximately 15-25 microns is removed to form the edge feature. The lower energy of the edge feature formation compared to the irradiating may prevent formation of additional micro-cracks during the edge feature formation or introduce additional micro-cracks that are smaller than the micro-cracks formed by the irradiating. By way of still another example, the formation of the edge feature may be performed for a smaller amount of time than the irradiating, thus being less likely to produce a thermal gradient that may thermally stress the ceramic material.

Although the example process 200 is illustrated and described as including particular operations performed in a particular order, it is understood that this is an example. In various implementations, various orders of the same, similar, and/or different operations may be performed without departing from the scope of the present disclosure. For example, in some implementations, one or more operations discussed with respect to FIG. 3 below may be performed without departing from the scope of the present disclosure.

In one example of the process 200, a section of ceramic material may be cut from a larger piece of ceramic material by irradiating the ceramic material using a laser beam. The laser beam may be directed around a section of the larger piece of ceramic material to irradiate around a shape of the section of ceramic material (which may be round, square, oval, rectangular, triangular, irregular, and/or any other shape) to form a cut between the section of ceramic material and the larger piece of ceramic material. The section of ceramic material may thus be separated from the larger piece of ceramic material. The laser beam may then be directed around the outside region of the section of ceramic material adjacent to the cut to irradiate the region and form an edge feature by removing at least part of the region.

Figure 3:
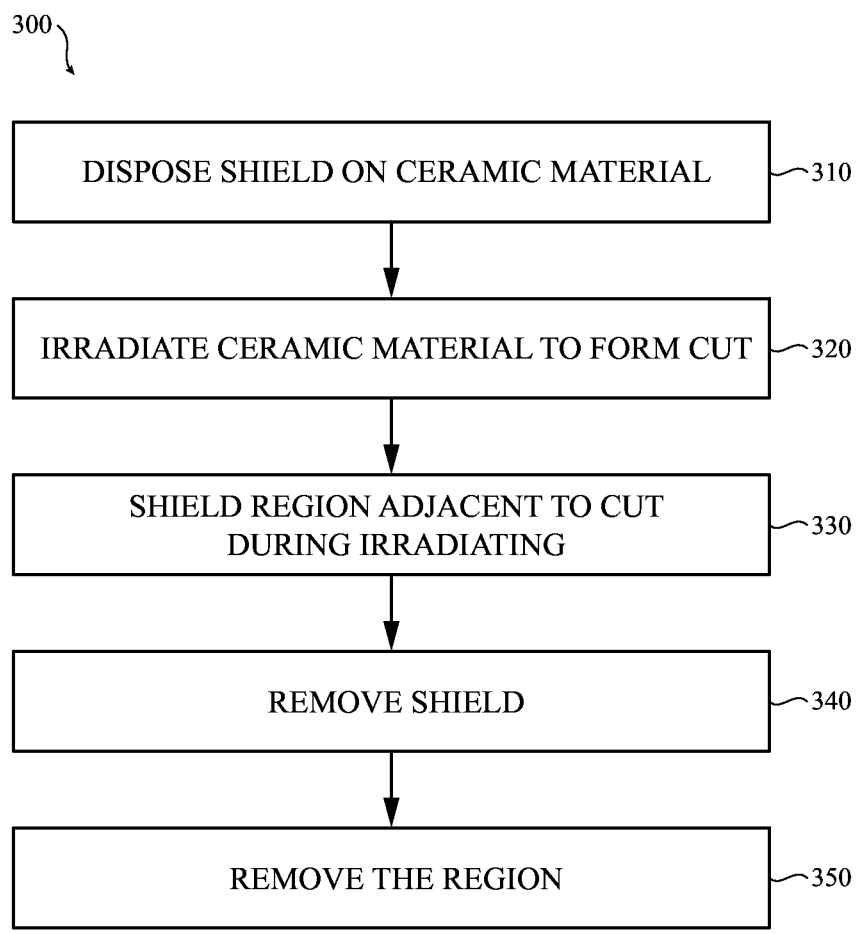
FIG. 3 shows a flow chart of a second example process for forming a ceramic component.

FIG. 3 shows a flow chart of a second example process 300 for forming a ceramic component. Such a ceramic component may be a component such as the cover sheet 11, the button sheet 12, and/or the back sheet 13 of FIGS. 1A-1B.

At 310, a shield may be disposed on a ceramic material. In some cases, the shield may be a polyethylene or other plastic and/or any other material operable to shield the ceramic material from an outer portion of a laser beam. Such an outer portion may have insufficient energy to cut the ceramic material, may have insufficient energy to cut the ceramic material completely or in a desired manner during irradiating, and/or may be shielded for other reasons. Such materials may include a polyester sheet, plastic film, paint (e.g., ink), curable opaque material (polymer spray), or other suitable material. The shield may be optically transparent or translucent, opaque, partially opaque, and so on. The shield may be disposed on the ceramic material using a variety of different processes such as a lamination process, a physical vapor deposition (PVD) process, a printing process, a painting process, or other technique for disposing the shield on the ceramic material.

At 320, a ceramic material may be irradiated with a laser beam to form a cut. The ceramic material may be cut using a laser beam as part of an ablation laser cutting operation (and/or another laser-based process such as laser fusion). At 330, a region of the ceramic material adjacent to the cut may be shielded during the irradiating using the shield disposed on the ceramic material. This shielding may reduce and/or eliminate the thermal stress of the laser beam on the region of the ceramic material adjacent to the cut.

In some cases, the shield may absorb at least part of the energy of one or more outer portions of the laser beam (such that the shield reduces thermal stress within the shielded region) and/or otherwise block at least part of the energy of such outer portions from the ceramic material. As the shield absorbs or blocks at least part of such outer portions, thermal stress of such portions on the region of the ceramic material adjacent to the cut may be reduced and/or eliminated (though such outer portions of the laser beam may still heat and/or otherwise induce some amount of thermal stresses in the region). The mechanical strength of the ceramic material may thus be improved by the reduction and/or elimination of the thermal stress.

In various cases, the shield may be formed of a material that does not burn or melt from irradiation by the outer portion of the laser beam to which the shield is exposed. This may enable the shield to optimally shield the region of the ceramic material adjacent to the cut and/or prevent molten portions of the shield from adhering to the ceramic material. In other cases, the shield may be sacrificial. As the shield may be removed in such cases, it may not matter if the shield burns or melts.

The shield may also perform various other functions during the irradiating operation. For example, the irradiating operation may scatter molten portions of ceramic material and the shield may protect the surface of the ceramic material on which it is disposed from such scattering molten portions of ceramic material. By way of another example, the shield may prevent scratching of the ceramic material and/or other damage during handling.

In various implementations, the process 300 may optionally include one or more additional operations, such as 340 and 350. At 340, the shield may be removed. The shield may be removed by a variety of different processes, such as peeling the shield from the ceramic material, dissolving the shield using a solvent, and/or any other such removal process.

At 350, an edge feature may be formed on the region of the ceramic material adjacent to the cut by removing at least a portion of the region. In some cases, the shield may not totally protect the region of the ceramic material adjacent to the cut from being thermally affected by the laser beam. In such cases, the mechanical strength of the ceramic material may be further improved by forming an edge feature in such regions.

For example, a first laser-based process may be used at 320 to form the cut and heat the region through the shield to form a defect in the ceramic material and the defect may be removed using a second laser-based process. In other examples, the same laser-based process may both form and remove the defect. In yet other examples, a laser-based process may be used to form the cut and one or more mechanical processes (such as machining, grinding, lapping, polishing, abrasion, blasting, etching, and/or any other process) may be used to remove a region adjacent to the cut.

Although the example process 300 is illustrated and described as including particular operations performed in a particular order, it is understood that this is an example. In various implementations, various orders of the same, similar, and/or different operations may be performed without departing from the scope of the present disclosure.

For example, although 340 and 350 are illustrated and described as removing the shield after irradiating the ceramic material and then removing the region of the ceramic material adjacent to the cut, it should be understood that this is an example. In some implementations, the edge feature may be formed before the shield is removed, thus also removing a region of the shield. In other implementations, the shield may not be removed, such as in cases where the shield functions as a surface treatment (such as a scratch resistant coating, an oleophobic coating, a hydrophobic coating, a glare resistant coating, and so on) for the ceramic material.

By way of another example, the process 300 is illustrated and described as disposing the shield on (and/or otherwise applying the shield to) the ceramic material before irradiating the ceramic material. However, in other implementations, irradiating may be performed iteratively and the shield may be applied partway through the iterative irradiating process.

FIGS. 4A-4H show cross-sectional views of a ceramic material 401 undergoing a process of forming a ceramic component for an electronic device such as the cover sheet 11, the button sheet 12, and/or the back sheet 13 of FIGS. 1A-B. The process may correspond to the first example process 200 of FIG. 2.

Figure 4A:
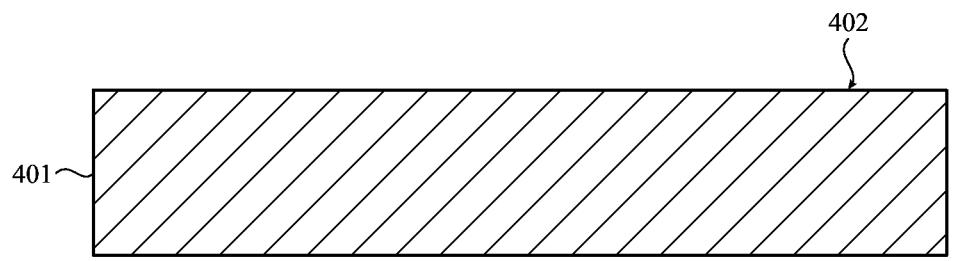
FIGS. 4A-4H show cross-sectional views of a ceramic material undergoing a process of forming a ceramic component for an electronic device such as is depicted in FIGS. 1A-B. The process may be the first example process of FIG. 2.

FIG. 4A illustrates a ceramic material 401, such as sapphire, having a surface 402. One or more portions of the ceramic material 401, such as the surface 402, may be subjected to one or more treatments such as grinding, palling, and polishing for a variety of purposes such as achieving a fine surface finish on the surface 402. Additionally, the ceramic material 401 may undergo various pre-processing procedures prior to a laser cutting operation. In a non-limiting example, the ceramic material 401 may be sliced from a boule, ground down to a particular thickness, and/or polished to provide a particular surface finish.

Figure 4B:
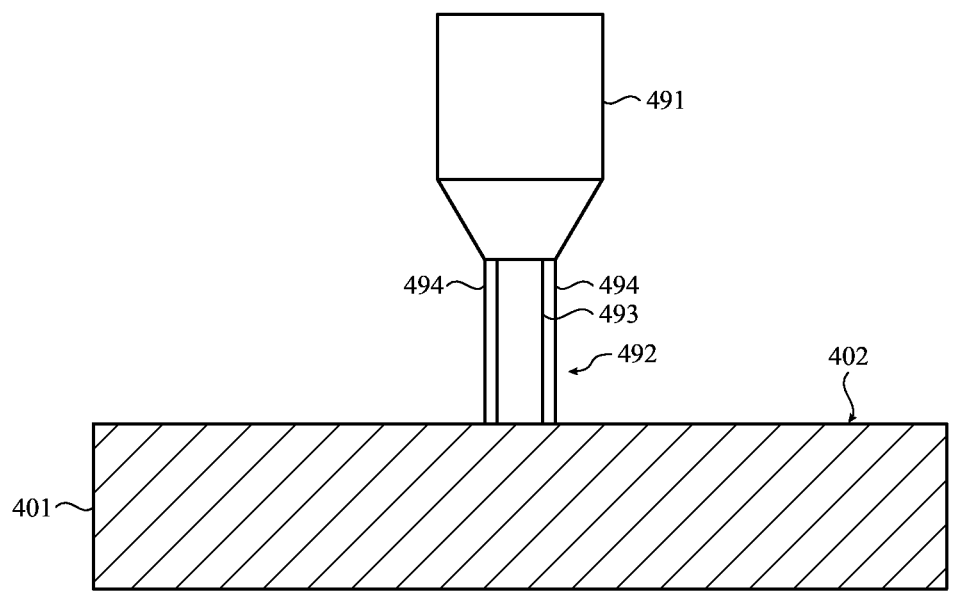
Figure 4C:
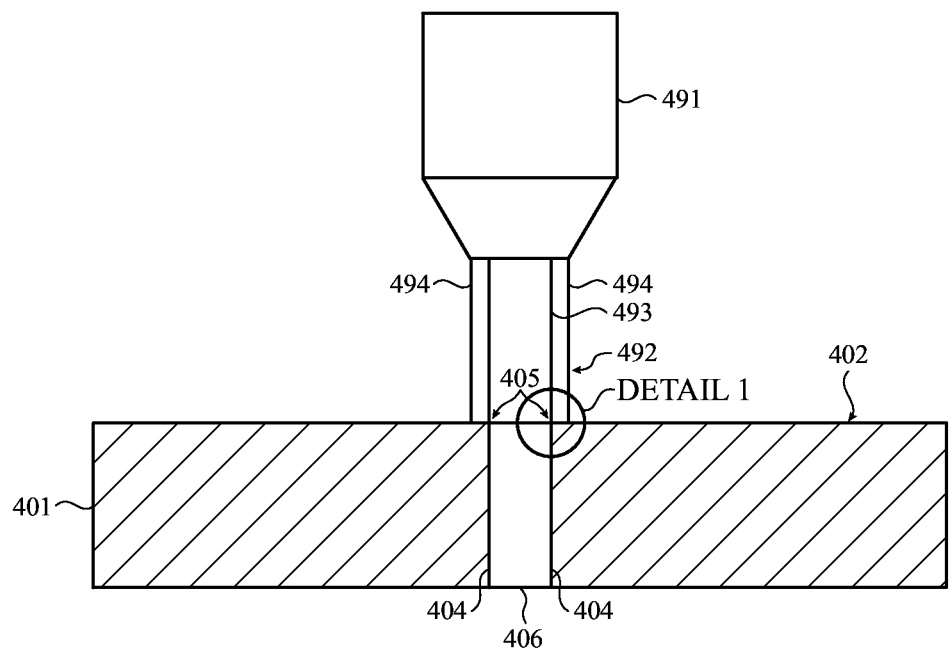

FIG. 4B illustrates irradiation of a portion of the surface 402 using a first laser-based process. The first laser-based process may use a laser beam 492 produced by a laser 491. The ceramic material 401 is irradiated with the laser beam 492 to form a cut 406, as shown in FIG. 4C. FIGS. 4B and 4C may correspond to operations 210-220 of FIG. 2.

As illustrated in FIGS. 4B and 4C, the laser beam 492 produced by the laser 491 may have a core 493 and one or more outer portions 494 outside of the core 493. The core 493 may have a higher energy density than the outer portions 494 such that the energy of the core 493 is sufficient to cut the ceramic material 401 whereas the lower energy of the outer portions 494 to which one or more regions (corners 405, or edges) adjacent to the cut 406 are subjected is insufficient to cut the ceramic material 401 during irradiating. For example, the core 493 may have a power ranging from 10 watts to 100 watts, the outer portions 494 may have a power below 10 watts, and a power below 10 watts may be insufficient to cut the ceramic material 401 during irradiating. Though the outer portions 494 of the laser beam 492 have insufficient energy to cut the ceramic material 401, they may still heat (or otherwise induce thermal stresses in) the side surfaces 404 or other regions of the ceramic material 401 adjacent to the cut 406, particularly the corners 405 of the surface 402 that is irradiated by the laser beam 492.

Described another way, the laser beam 492 may have a non-uniform (e.g., Gaussian) energy distribution such that a first region of the ceramic material 401 is irradiated with sufficient energy that the first part evaporates, sublimates, or is converted to plasma (or melts or is otherwise cut) whereas a second region of the ceramic material 401 is irradiated with only enough energy to heat (and/or only partially evaporate, sublimate, convert to plasma, melt, and/or otherwise cut) the second region of the ceramic material 401. The first region of the ceramic material 401 may correspond to the cut 406 that is subjected to the core 493. The second region of the ceramic material 401 may correspond to the corners 405 that are subjected to the outer portions 494.

Figure 4D:
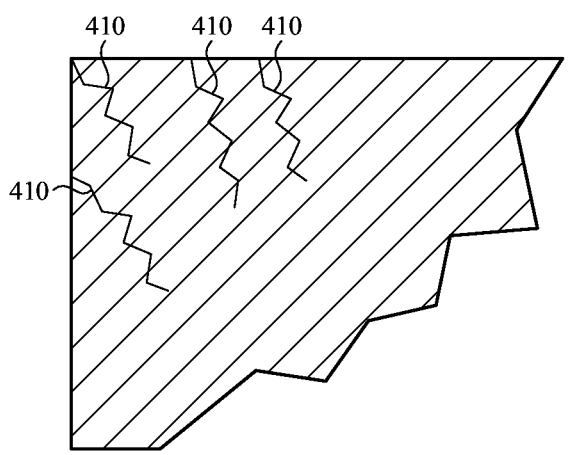

FIG. 4D is a detail view of one of the corners 405 of the surface 402. As illustrated, the heating of the ceramic material 401 by the outer portions 494 of the laser beam 492 may form micro-cracks 410 or other defects in the ceramic material 401.

Figure 4E:
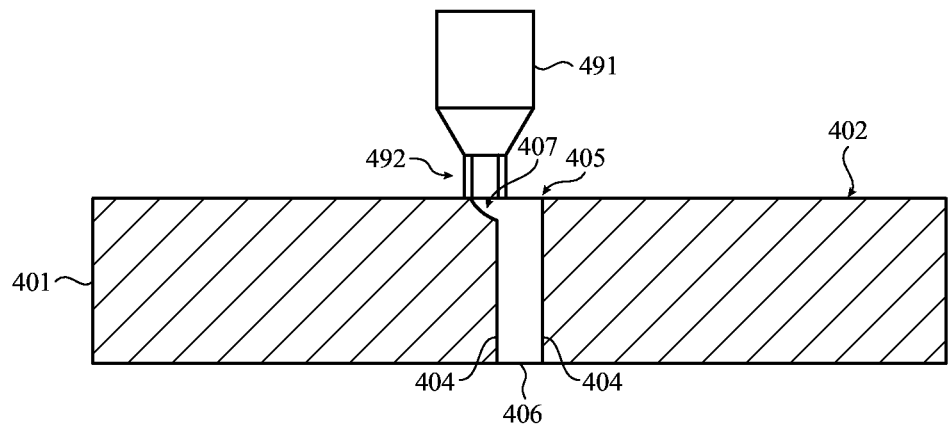
Figure 4F:
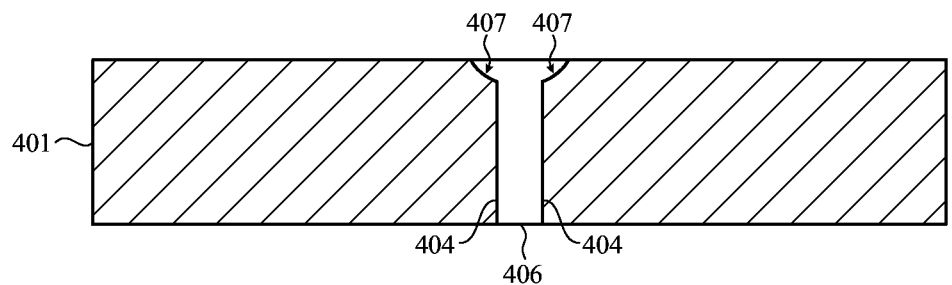
Figure 4G:
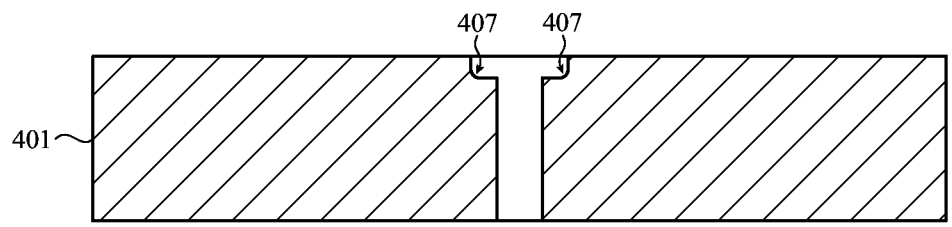
Figure 4H:
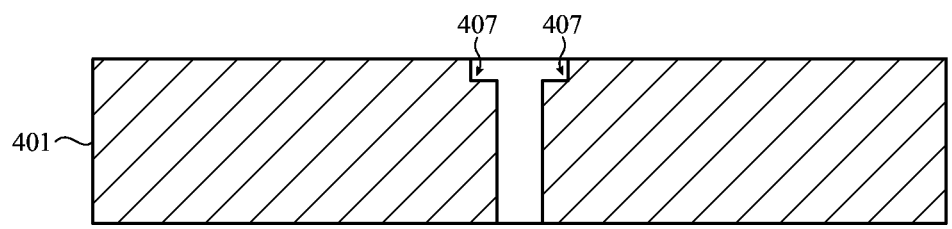

FIG. 4E illustrates removal of a region of one of the corners 405 of the surface 402 to produce an edge feature 407 on one of the side surfaces 404 of the ceramic material 401. FIG. 4F shows the ceramic material 401 after formation of an edge feature 407 on the other corner 405. FIGS. 4E and 4F may correspond to operation 230 of FIG. 2.

As shown in FIGS. 4E and 4F, the formation of the edge feature 407 may be performed using a laser-based process (whether the first laser-based process or another, second laser-based process) that uses the laser beam 492. The formation of the edge feature 407 may remove at least part of the portions of the region of the ceramic material heated by the laser beam 492, thus removing at least part of the micro-cracks 410 and improving the mechanical strength of the ceramic material. The formation of the edge feature 407 may also cause molten ceramic material 401 to flow into some of the micro-cracks 410, sealing those micro-cracks 410 and improving the mechanical strength of the ceramic material. The formation of the edge feature 407 may further change the geometry of the side surfaces 404 to reduce contact point sharpness, thus reducing the possibility that the side surfaces 404 will be affected by an impact or shock that will transfer to weaknesses such as present micro-cracks 410 and improving the mechanical strength of the ceramic material 401.

The formation of the edge feature 407 may be a lower energy and/or shorter duration process than the irradiating to form the cut such that the formation of the edge feature 407 does not introduce additional micro-cracks 410 in the ceramic material and/or introduce additional micro-cracks 410 in the ceramic material that are smaller than the micro-cracks formed by the irradiating. In some cases, this may be accomplished by configuring the laser 491 to produce the laser beam 492 differently during formation of the edge feature 407 than during irradiating. For example, the laser 491 may produce the laser beam 492 at 30-45 watts average power for 7-15 pulses during irradiating and at 10-25 watts average power for 1 pulse during formation of the edge feature 407. In other cases, this may be accomplished by the formation of the edge feature 407 removing a smaller amount of the ceramic material 401 than is removed by the irradiating. For example, the cut 406 may be formed through 0.3 millimeters of the thickness of the ceramic material 401 whereas the edge features 407 may be formed approximately 15-25 microns in depth into the surface 402 and from the side surfaces 404.

Although the edge features 407 are shown as being formed with a particular geometry, it is understood that this is an example. In various implementations, the edge features 407 may be formed with a variety of different geometries without departing from the scope of the present disclosure. For example, FIGS. 4G and H show the edge features 407 with a shelf geometry with rounded corners and a shelf geometry with sharp corners, respectively.

FIGS. 5A-5D show cross-sectional views of a ceramic material 501 undergoing a process of forming a ceramic component for an electronic device such as the cover sheet 11, the button sheet 12, and/or the back sheet 13 of FIGS. 1A-B. The process may correspond to the second example process 300 of FIG. 3.

Figure 5A:
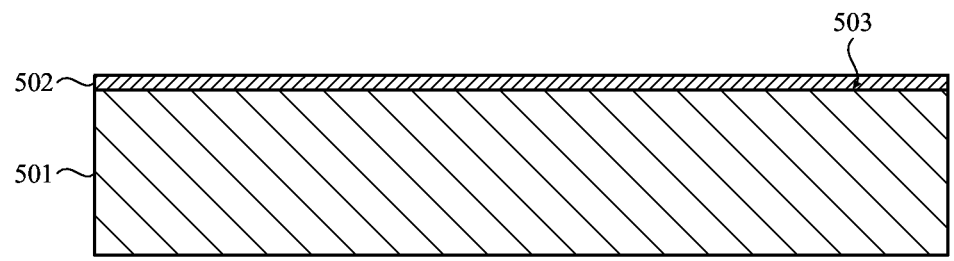
FIGS. 5A-5D show cross-sectional views of a ceramic material undergoing a process of forming a ceramic component for an electronic device such as is depicted in FIGS. 1A-B. The process may be the second example process of FIG. 3.

FIG. 5A illustrates disposition of a shield 502 on a surface 503 of a ceramic material 501. By way of example, in some implementations, the shield 502 may be a polyethylene or other plastic film. However, in other implementations, the shield 502 may be any material that absorbs, blocks, and/or otherwise shields outer portions of a laser beam (such as those outer portions with energy insufficient to cut the ceramic material 501 during irradiating) from the ceramic material. The shield 502 may be disposed on the surface 503 of the ceramic material 501 by lamination, PVD, printing, painting, or other disposition process. By way of non-limiting example, the ceramic material 501 may have a thickness of approximately 0.3 millimeters and the shield may have a thickness of approximately 0.15-0.25 millimeters for a total thickness of approximately 0.45-0.55 millimeters. FIG. 5A may correspond to operation 310 of FIG. 3.

Figure 5B:
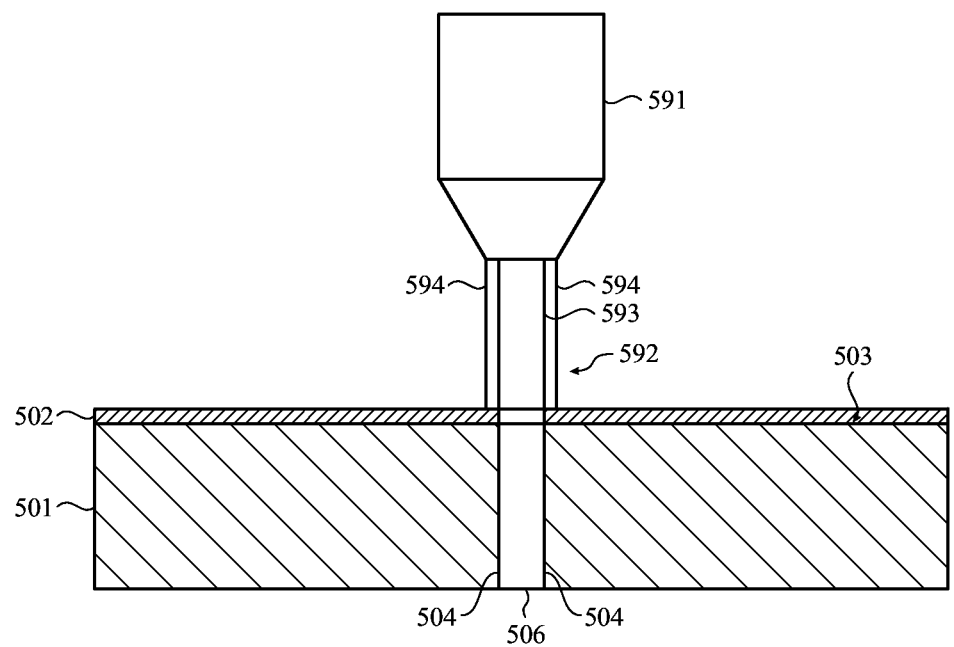

FIG. 5B illustrates irradiating a portion of the shield 502 and the surface 503 using a laser beam 592 produced by a laser 591 to form a cut 506. The laser beam 592 has a core 593 with an energy sufficient to cut the ceramic material 501 and one or more outer portions 594 outside of the core 593 with energy insufficient to cut the ceramic material 501 during irradiating. As shown, the shield 502 shields or blocks the side surfaces 504 adjacent to the cut 506 or other regions from the outer portions 594 (and/or absorbs at least part of the energy of the outer portions 594 and/or otherwise protects the side surfaces 504 from the outer portions 594), preventing or reducing thermal stress of the outer portions 594 on the side surfaces 504 of the ceramic material 501 and thus reducing or eliminating formation of micro-cracks or other defects. As a result, the mechanical strength of the ceramic material 501 is improved over a cut made without the shield 502. FIG. 5B may correspond to operations 320 and 330 of FIG. 3.

As shown, the material of the shield 502 may not burn or melt from irradiation by the outer portions 594 of the laser beam 592. This may allow the shield 502 to shield the ceramic material 501 during the entire irradiating process as opposed to burning away or melting and exposing portions of the side surfaces 504 of the ceramic material 501 partway through. This may also prevent molten portions of the shield 502 from adhering to the ceramic material 501.

Although FIGS. 5A-5B illustrate the laser beam 592 cutting the shield 502 as well as the ceramic material 501, it is understood that this is an example. In various implementations, the shield 502 may be configured with one or more gaps that correspond to the core 593. As such, the portions of the shield 502 around the gap shield the ceramic material 501 from the outer portions 594 but the shield 502 is not irradiated by the core 593 and is not cut during cutting of the ceramic material. Various procedures are possible and contemplated.

Figure 5C:
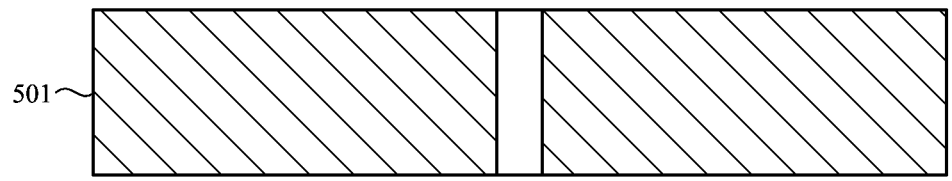

FIG. 5C illustrates optional removal of the shield 502 from the ceramic material 501 that may be performed in some implementations. FIG. 5C may correspond to the optional operation 340 of FIG. 3.

Figure 5D:
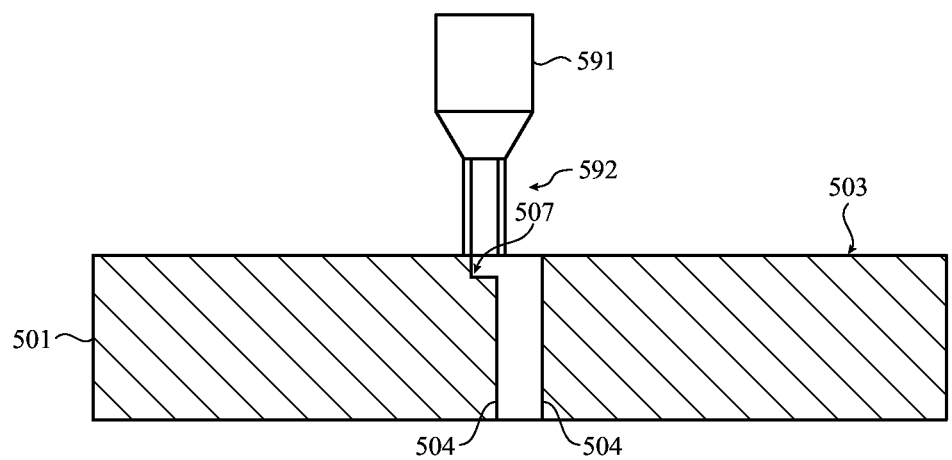

FIG. 5D illustrates optional removal of a region of one of the corners (edges) of the surface 503 by laser ablating using the laser beam 592 produced by the laser 591 to produce an edge feature 507 on one of the side surfaces 504 of the ceramic material 501. In some cases, the shield 502 may not completely shield the side surfaces 504 from the laser beam 592 and the side surfaces 504 may still be heated and/or thermal stresses may be otherwise induced therein that may form one or more defects. By forming the edge feature 507, damage caused to the ceramic material 501 by the irradiating may be partially or fully mitigated and the mechanical strength of the ceramic material may be further improved. FIG. 5D may correspond to operation 350 of FIG. 3.

Although a particular process is illustrated and described with respect to FIGS. 5A-5D, it is understood that this is an example. In various implementations, various combinations of the same, similar, and/or different operations may be performed in a variety of orders without departing from the scope of the present disclosure. For example, in some implementations, the edge feature 507 may be formed prior to removal of the shield 502 and/or removal of the shield 502 may be omitted.

By way of another example, although FIG. 5D illustrates removal of the region using the laser beam 592, it should be understood that this is an example. In various implementations, such removal may be performed using one or more mechanical processes, such as machining, grinding, lapping, polishing, abrasion, blasting, etching, and/or any other process capable of removing the region.

As described above and illustrated in the accompanying figures, the present disclosure relates to forming a ceramic component using laser cutting. A ceramic material may be irradiated using a laser-based process to form a cut. In some implementations, a region of the ceramic material adjacent to the cut may be heated and the region may be removed to form an edge feature (such as a chamfer, a bezel, a shelf, a curve, a rounding, and so on). In various implementations, the laser-based process may use a laser beam and the region of the ceramic material adjacent to the cut may be shielded from an outer portion of the laser beam using a shield (which may be formed of polyethylene or another plastic and/or any material operable to shield the ceramic material from an outer portion of the laser beam, such as by absorbing and/or blocking at least part of the outer portion of the laser beam, with insufficient energy to cut the ceramic material during irradiating). This removal and/or shielding may improve the mechanical strength of the ceramic material.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for forming a ceramic component, comprising:
    irradiating a ceramic material to form a cut having a first depth using a first laser-based process having a first laser beam at a first power, the first laser-based process defining a diameter of the cut;
    heating a region of the ceramic material adjacent to the cut by irradiating the region with the first laser beam subsequent to forming the cut; and
    removing the region of the ceramic material by forming an edge feature having a second depth that is less than the first depth, the edge feature formed using a second laser-based process having a second laser beam at a second power that is less than the first power and that is directed at the region of the ceramic material adjacent to the cut.

2. The method of claim 1, wherein:
    the operation of heating heats the region of the ceramic material with an outer portion of the first laser beam; and the outer portion has an energy insufficient to cut the ceramic material during the operation of irradiating.

3. The method of claim 1, wherein the operation of heating the region of the ceramic material forms a defect in the ceramic material.

4. The method of claim 1, wherein the operation of heating the region of the ceramic material forms micro-cracks in the ceramic material.

5. The method of claim 4, wherein the operation of removing the region of the ceramic material removes the micro-cracks in the ceramic material.

6. The method of claim 4, wherein the operation of removing the region of the ceramic material introduces additional micro-cracks in the ceramic material that are smaller than the micro-cracks.

7. The method of claim 1, wherein the operation of removing the region of the ceramic material removes a section of the ceramic material having a depth of approximately 15-25 microns.

8. The method of claim 1, wherein the first power is approximately 30-45 watts and the second power is approximately 10-25 watts.

9. The method of claim 1, wherein the first laser beam is produced for approximately 7-15 pulses and the second laser beam is produced for approximately 1 pulse.

10. The method of claim 1, wherein the second laser-based process includes a shorter duration pulse than the first laser-based process.

11. A method for forming a ceramic component, comprising:
irradiating a ceramic material with a first laser-based process having a first laser beam to form a cut having a first depth, the irradiating with the first laser-based process defining a diameter of the cut;
shielding, with a shield, a region of the ceramic material adjacent to the cut from an outer portion of the first laser beam;
heating the region of the ceramic material through the shield by irradiating the region using an operation of the first laser-based process subsequent to forming the cut; and
removing a defect formed in the ceramic material to form an edge feature having a second depth less than the first depth, the edge feature formed by the irradiating using a second laser beam that is directed at the region of the ceramic material adjacent to the cut and that has a lower power by at least 5 watts average power, or a shorter pulse duration than the first laser beam.

12. The method of claim 11, further comprising absorbing, with the shield, at least part of an energy of the outer portion of the first laser beam to reduce thermal stress within the region.

13. The method of claim 11, further comprising applying the shield to the ceramic material before the operation of irradiating the ceramic material.

14. The method of claim 11, wherein the operation of shielding comprises shielding the region of the ceramic material with a plastic film.

15. A method for forming a ceramic component, comprising:
irradiating a ceramic material to form a cut having a first depth using a first laser-based process having a first laser beam applied for a first duration, the first laser-based process defining a diameter of the cut and
heating a region of the ceramic material adjacent to the cut by irradiating the region using the first laser beam subsequent to forming the cut; and
removing the region of the ceramic material adjacent to the cut to form an edge feature having a second depth that is less than the first depth, the edge feature formed using a second laser-based process having a second laser beam that is directed at the region of the ceramic material adjacent to the cut and applied for a second duration that is less than the first duration.

16. The method of claim 15, wherein the first duration is at least seven times longer than the second duration.

17. The method of claim 15, wherein application of the second laser beam for the second curation removes less of the ceramic material than application of the first laser beam for the first duration.

18. The method of claim 15, wherein the first duration comprises multiple pulses.

* * * * *